No. 882,755.  
PATENTED MAR. 24, 1908.  
A. A. HAMILTON.  
ANIMAL TRAP.  
APPLICATION FILED NOV. 1, 1907.
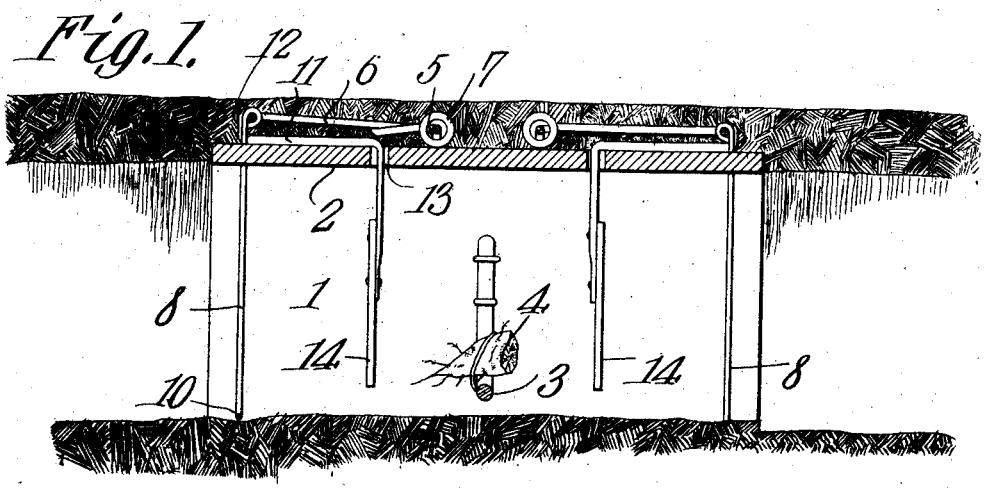
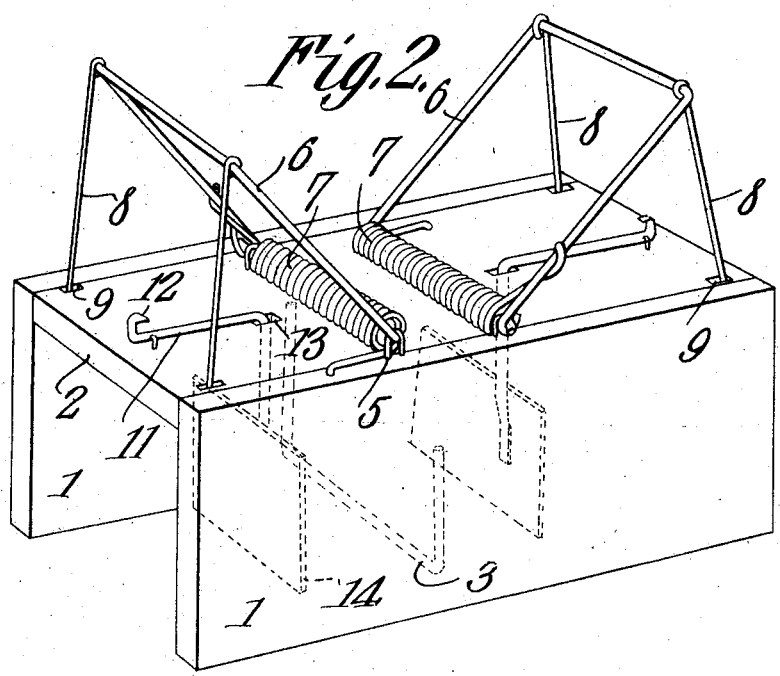
Witnesses  
Inventor  
Almon A. Hamilton.  
By C. A. Snow & Co.  
Attorneys
THE NORRIS PETERS CO., WASHINGTON, D. C.

UNITED STATES PATENT OFFICE.

ALMON A. HAMILTON, OF PAWNEE CITY, NEBRASKA.

ANIMAL-TRAP.

No. 882,755.  Specification of Letters Patent.  Patented March 24, 1908.

Application filed November 1, 1907. Serial No. 400,248.

*To all whom it may concern:*

Be it known that I, ALMON A. HAMILTON, a citizen of the United States, residing at Pawnee City, in the county of Pawnee and State of Nebraska, have invented a new and useful Animal-Trap, of which the following is a specification.

This invention has relation to animal traps and it consists in the novel construction and arrangement of its parts as hereinafter shown and described.

The object of the invention is to provide a trap of the character indicated which may be readily inserted in alinement with a passage or tunnel used by animals as places of abode beneath the surface of the soil.

The trap is so constructed as to form a portion of the side walls and top of the said passage when inserted in place and is provided at its opposite ends with independently spring actuated loops and an independent trip for retaining each loop against the tension of its operating spring. A bait holder is mounted between the said trips and thus the trap is adapted to catch the animals irrespective of the directions from which they approach the trap in the said passage.

In the accompanying drawing: Figure 1 is a longitudinal sectional view of the trap showing the same in position with relation to the animal passage, and Fig. 2 is a perspective view of the trap.

The trap consists of the side pieces 1 joined together at their upper edges by the top piece 2. The cross bar 3 is located between the lower middle portions of the side pieces 1 and is adapted to hold a bait 4 as indicated in Fig. 1. The trap is provided upon its top and at the opposite sides of its middle with the bearings 5 in which are journaled the rectangular frames 6. The coil springs 7 surround one side of the frame 6 and bear at one end upon the top of the trap and their other ends against the sides of the frames 6.
The said springs are under tension to keep the sides of the frame 6 remote from the bearings 5 in elevated positions. A loop 8 is attached to the swinging side of each frame 6 and passes down through perforations 9 provided in the top of the trap and these loops are provided with intermediate portions 10 which lie under the top of the trap and operate between the sides 1 thereof. The trips 11 are pivotally mounted on top of the piece 2 and are provided at their outer ends with hooked portions 12 which are adapted to engage intermediate portions of the swinging sides of the frames 6. From their pivotal supports the said trips 11 extend toward the middle of the trap and pass down through perforations 13 provided in the top 2 and are provided at their lower extremities with the vertically disposed plates 14 which substantially close the transverse area of the space between the sides 1—1 of the trap. The plates 14, 14 are located upon the opposite sides of the bait 4 and the support 3.

To place a trap in position a section of the passage through which the animal passes is removed and the trap is inserted in alinement with the said passage in the manner as shown in Fig. 1. Preferably the sides 1, 1 are pressed down so that their lower edges will be below the bottom of the animal passage and the intermediate portions 10 of the loops 8 will be depressed into the bottom of the animal passage and concealed by earth. Also, it is preferable to sprinkle a thin layer of earth over the top of the trap to keep out the light and air or other elements calculated to awake suspicion on the part of the animal. The trap is set by depressing the swinging edges of the frames 6 and catching them under the hooks 12 of the trips 11, the bait 4 having previously been attached to the support 3. When the trap is thus set and an animal enters the passage in the ground in either direction with relation to the trap as soon as it perceives the presence of the bait by reason of its scent the animal moves toward the bait and in its endeavor to reach the same comes in contact with the plate 14 and operates the trip 11 which in turn liberates its coöperating frame 6 which is swung by the attached coil spring 7 and the loop 8 is forcibly elevated under the middle of the animal which is impinged thereby against the top 2 of the trap. At the same time the frame 6 is elevated above the surface of the ground and serves as a signal indicating that the trap has been operated. By this arrangement it will be observed that a trap is provided which is adapted to capture the animal if it approaches in either one of two directions or it may capture animals approaching from opposite directions and that in either instance but a single bait is used. Furthermore the construction is simple in that the trip has direct engagement with the swinging frame in holding the same against the tension of the spring.

Having described my invention what I claim as new and desire to secure by Letters-Patent is:—

A trap comprising a body made up of a top and side pieces, a bait support located between the side pieces trapping mechanisms located at the opposite ends of the body and each consisting of a spring actuated frame mounted upon the top of the body, a loop attached to the frame and passing through the top of the body, a trip pivoted on the top of the body and having a hooked end for engagement with the free edges of the frame, said hook having a depending portion which passes through the top of the body and a plate attached to the lower end of the trip, said plates being located upon opposite sides of the bait support and substantially closing the transverse area of the space between the sides of the trap body.

In testimony that I claim the foregoing as my own, I have hereto affixed my signature in the presence of two witnesses.

ALMON A. HAMILTON.

Witnesses:
ROBERT COLLINS,
JACOB RIST.